Jan. 7, 1964
G. G. LAKOS
3,116,802
DEVICE FOR RECORDING OF MEASUREMENTS
Filed April 21, 1960
3 Sheets-Sheet 2
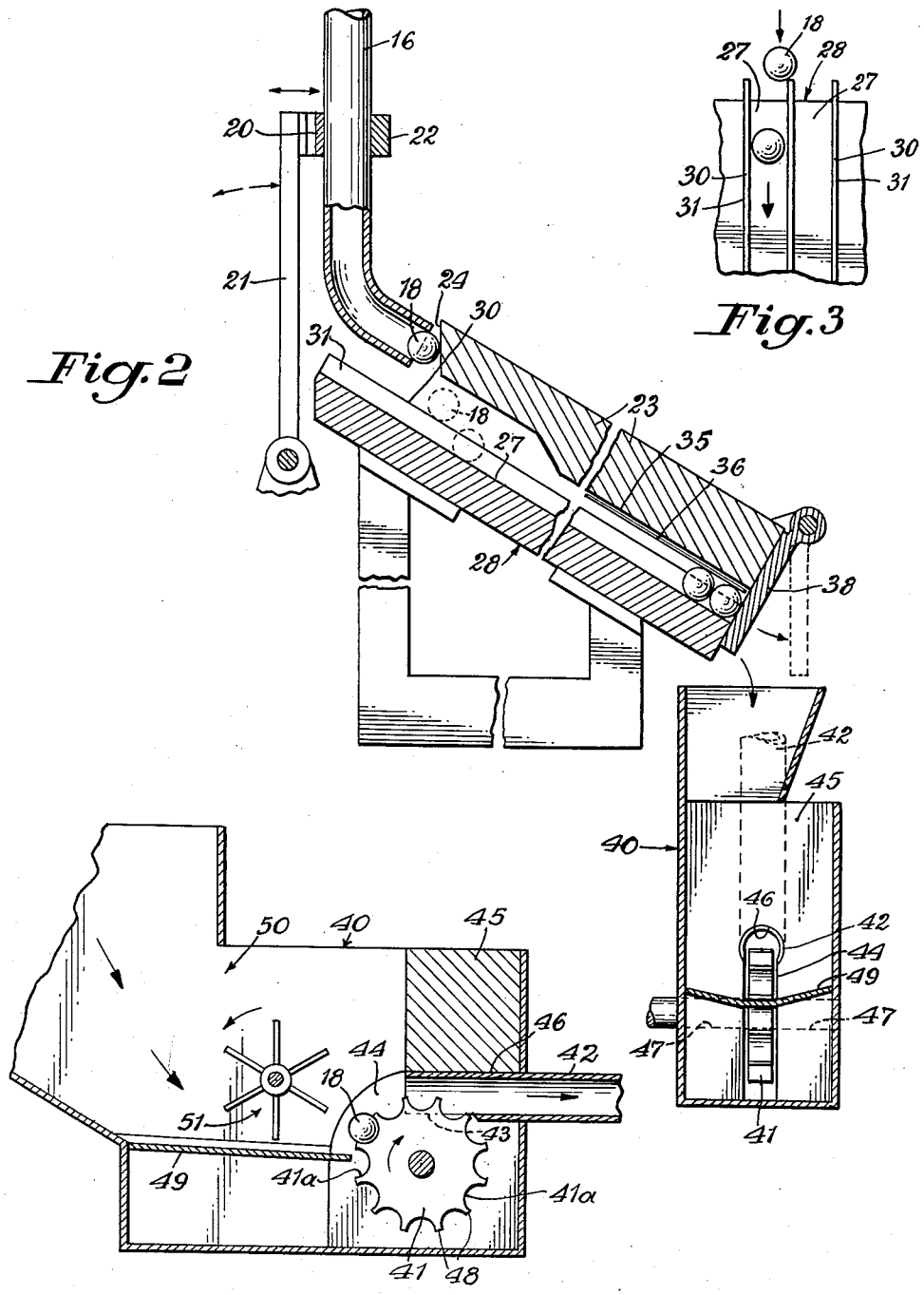

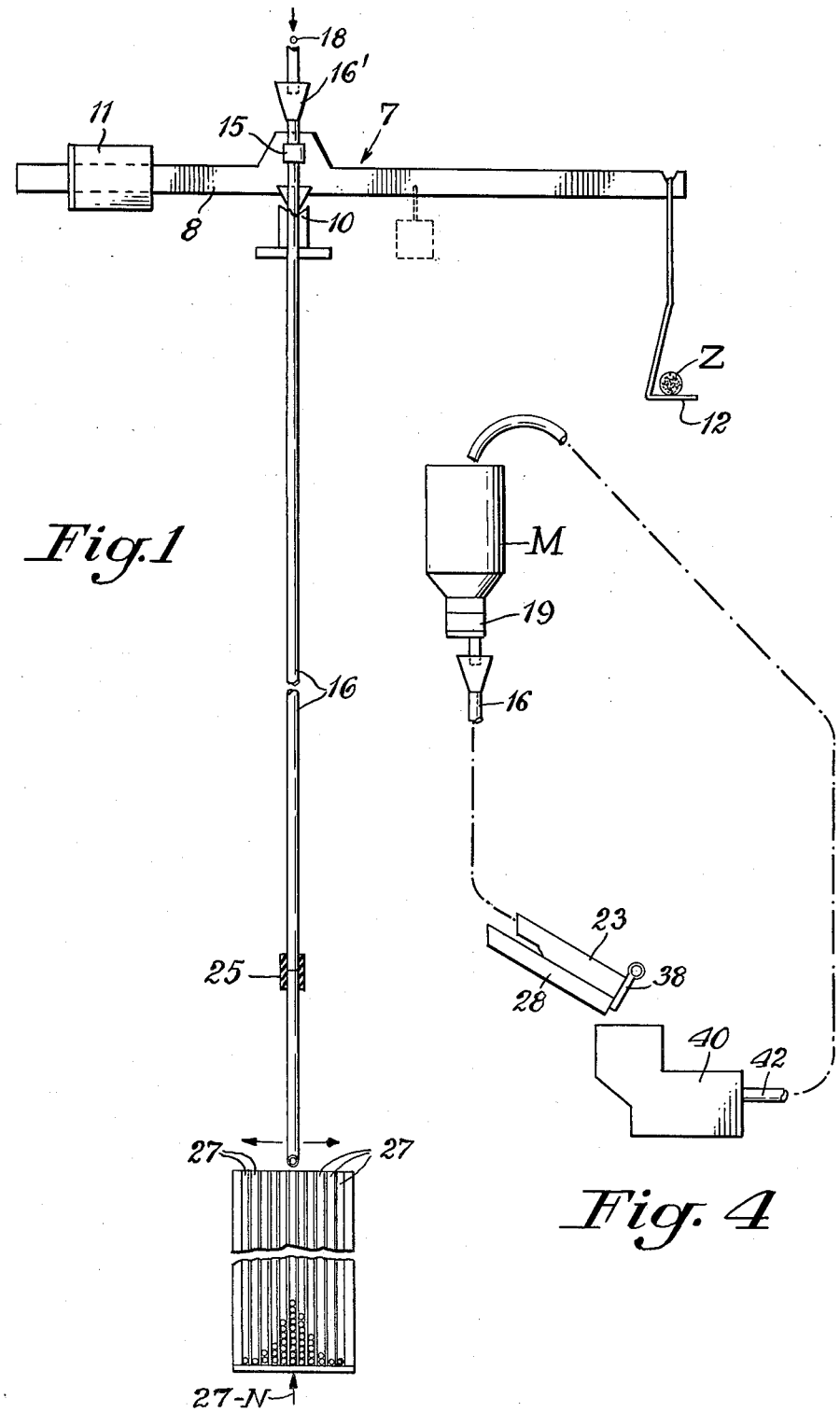

Jan. 7, 1964   G. G. LAKOS   3,116,802
DEVICE FOR RECORDING OF MEASUREMENTS
Filed April 21, 1960   3 Sheets-Sheet 3

United States Patent Office 3,116,802
Patented Jan. 7, 1964

3,116,802
DEVICE FOR RECORDING OF MEASUREMENTS
Georg Gabriel Lakos, Hamburg-Lohbrugge, Germany, assignor to Hauni-Werke Korber & Co. K.G., Hamburg-Bergedorf, Germany
Filed Apr. 21, 1960, Ser. No. 23,755
Claims priority, application Germany Apr. 21, 1959
4 Claims. (Cl. 177—202)

The invention relates to a recording device which, without being so limited, is particularly applicable to a laboratory balance scale or a precision balance scale and which can be used for recording the weights of a number of cigarettes.

Devices are known in which the measuring operations are accompanied by the delivery of balls from a magazine and in which the balls roll into grooves which correspond to certain measuring values. The grooves are arranged in a recording plate, whereby one groove corresponds to the normal weight while the other grooves correspond to plus and minus variations from a standard value which may be expected for different articles of the same nominal weight.

The invention relates to improvements in such recording devices and consists essentially in the improvement that the ball guide which supplies the balls to the recording grooves is arranged in direct association with the indicating element of the measuring device. In case of a weighing device, the weighing indicator can be constructed as the ball guide and for this purpose is formed as a pendulum tube, the lower end of which moves over the receiving ends of the recording grooves arranged in a recording table. After each measuring operation the ball guide is stopped and only then is a ball released from a magazine. The ball then rolls up to a stop provided in the region of the receiving ends of the recording grooves and thereafter is released to drop into one of the grooves.

The device of the invention is simple in construction, easy to manipulate and can be arranged for completely automatic or for semi-automatic operation wherein the recording operations can be performed after a predetermined number of operating cycles or after predetermined time periods.

The discharge of the balls from the grooves of the recording table can be effected manually or automatically, and the filling of the ball magazine can be effected continuously by means of a feeder device or pump which receives the balls from a collecting device.

The accompanying drawings illustrate two examples of the invention.

Figure 7:
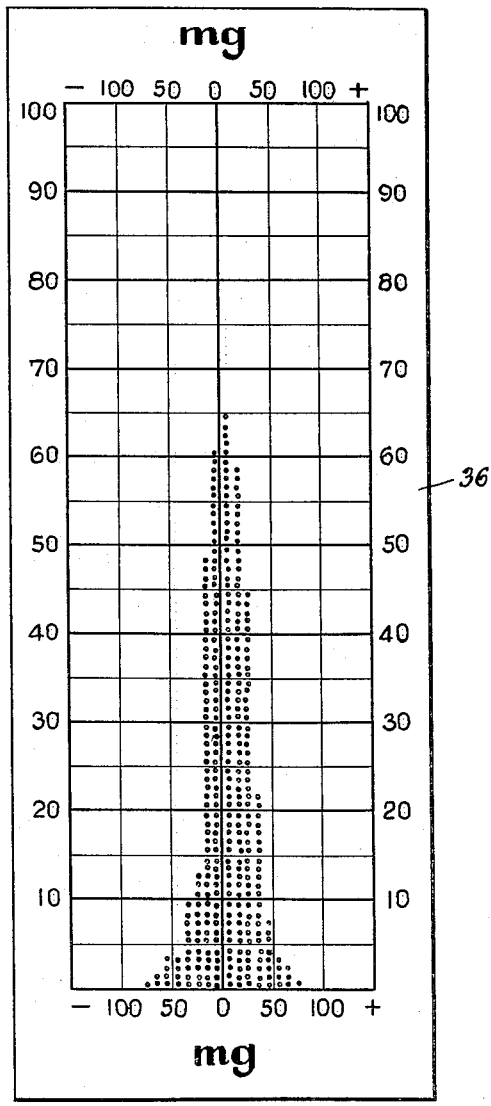
Figure 6:
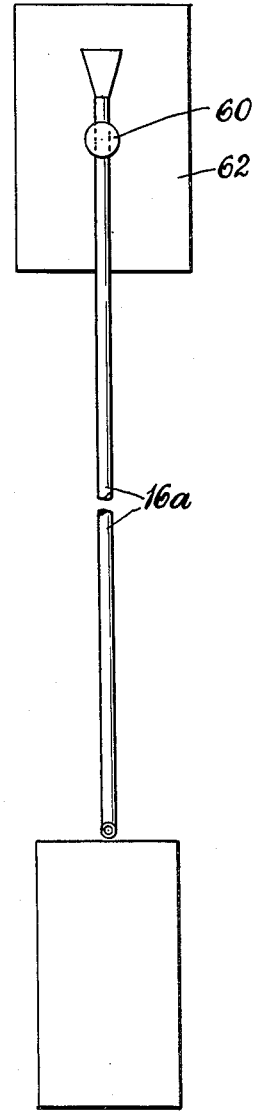

FIG. 1 shows the first embodiment of the invention in elevation,

FIG. 2 is a partial sectional view of the recording table and a collecting container for the balls when the same are released from the parallel grooves of the recording table, FIG. 3 is a partial plan view of the recording table, FIG. 4 is a diagram showing the path of the balls in the embodiment of FIG. 1, FIG. 5 is a longitudinal sectional view of the collecting container, FIG. 6 is a diagrammatic view of the device of the invention when used with a moisture-measuring instrument, and FIG. 7 is a view of a chart provided with depressions caused by the balls in the recording table.

Referring to FIG. 1, the balance scale 7 is provided with a horizontal beam 8 supported between its ends by a knife edge bearing 10. One arm of the beam 8 carries an adjustable weight 11 and the other arm has suspended therefrom a weighing pan 12 upon which the articles, such as cigarettes Z, to be weighed are placed.

The cigarettes Z are supplied automatically from a magazine, not shown, at predetermined rate to the pan 12, are weighed thereon and then are again removed from the pan automatically. The beam 8 has fixedly attached thereto at 15 directly above the bearing 10 a downwardly extending tube 16, the upper end 16' of which is funnel-shaped. During each weighing operation a ball 18 is released from a magazine M, for example as shown in FIG. 4 by the rotation of a disc 19 having an opening (not shown) corresponding with an opening in the magazine offset from the axis of rotation of the disc 19, in such a manner that the ball 18 will enter the upper end of the tube 16 and will drop or roll toward the lower end of the tube 16 by gravity.

The ball 18 is released from the magazine M only after the tube 16 has come to rest at the end of the weighing operation and has been stopped in a predetermined position. This is done in a simple manner by clamping the tube 16 between its ends and adjacent the lower end against a stationary stop 22 by means of a yieldable bar 20 secured to a pivotally mounted lever 21 which is pivotally moved in synchronism with the weighing operations and urges the tube 16 into engagement with the stop 22. When the ball 18 is released upon rotation of the disc 19 and the alignment of the openings in the magazine and disc 19, it rolls by gravity through the tube 16 until it reaches the lower end of the tube where a stop surface 24 on a plate 23 prevents the ball 18 from leaving the tube 16. When the bar 20 is moved away from the tube 16 by a pivotal movement of the lever 21, the tube 16 moves away from the stop 22, for example by its own inherent resiliency or by means of a flexible joint 25 arranged in the tube 16 between its ends and the action of a spring so that the ball 18 lying against the stop surface 24 drops from the lower end of the tube 16 and enters one of a plurality of parallel grooves 27 formed in the upper face of a recording table 28, depending upon which one of the grooves 27 is opposite the end of the tube 16. The recording table 28 is preferably arranged slightly inclined to the horizontal so that successive balls 18 position themselves by gravity in parallel columns in a pattern showing the weight distribution of the articles which have been weighed.

One of these grooves 27, that marked 27N in FIG. 1, represents the desired normal or standard weight of the article. The other grooves 27 to the left and right of the groove 27N represent the plus and minus tolerance weights according to their lateral distance from the groove 27N.

After the weighing operation and the release of the tube 16 from the clamped position against the stop surface 24 the ball 18 (FIG. 2) runs into the particular groove 27 determined by the position of the lower end of the tube 16 and travels up to a stop surface 24. The plate 23 with the stop surface 24 thereon can be removed manually or automatically from its operative stop position when required. The balls 18 thus accumulate in the corresponding grooves 27 so as to form columns of balls according to the various weights of the articles, such as cigarettes Z, so that an exact registration and display of the weights is effected, thereby showing that a certain number of cigarettes have a standard weight, while other cigarettes deviate from the normal weight by certain amounts.

If a ball 18 should fall directly upon the upper edge 30 of one of the webs 31 separating the grooves 27 one from the other, the ball 18 will drop finally into one of the two adjacent grooves 27.

The plate 23 with the stop surface 24 thereon forms a cover for the recording table 28 and is adapted to be raised and lowered. On its under face 35 the plate 23 has a prepared recording or chart paper 36 removably secured thereto, for example a metal foil. When the plate 23 is lowered after the recording chart has been secured thereto, the balls 18 in the grooves 27 produce markings on the charted paper or foil as a result of light pressure exerted on the plate 23 so that the position of the balls can be recorded for documentation purposes.

Various calculations can be made from the impressions on the chart 36 without removing the balls 18 from the recording table, for example after weighing each 100 articles.

The balls 18 are discharged from the table 28 by pivotally moving a gate plate 38 from the lower edge of the table 28. The balls 18 drop into a container 40 from which they are forced by means of a grooved wheel 41 into a tube 42, the lower horizontal entrance portion of which is provided with a slot 43. This results in a column of balls 18 formed in the tube 42 which leads to the magazine M. The grooved wheel 41 is rotated about a horizontal axis and is arranged in a slot 44 of a block 45 and the width of the slot 44 corresponds to the diameter of the balls 18. The walls defining the slot 44 also serve as stationary guide rails for the balls 18 in the region of the transverse grooves 41a of the wheel 41. A bore 46 is provided in the block 45 for the reception of the lower portion of the tube 42, the slot 43 of which is a continuation of the slot 44. The grooved wheel 41 is rotatable in bearings 47 and projects into the slots 43, 44 in the region of the tube 42 in such a manner that the balls in the transverse grooves 41a of the wheel 41 pass readily into the tube 42. The peripheral surfaces of the grooved wheel 41 or of the transverse webs 48 between the grooves 41a hinder return travel of the balls 18. The bottom 49 of the ball receiving chamber 50 in the container 40 is arranged approximately at the level of the axis of rotation of the grooved wheel 41. A bladed agitator wheel 51 rotates in the ball receiving chamber 40 so as to ensure that the balls 18 remain in movement and the grooved wheel 41 is constantly supplied with balls 18. The bottom 49 may also be arranged at a small inclination. The width of the grooved wheel 41 and of the slot 43 is less than the diameter of the balls 18 so that the grooved wheel 41 can enter the slot 43 in the tube 42.

In FIG. 6 the tube 16a is connected to the rotary or driven member 60 of a measuring device, for instance a moisture measuring and indicating device 62, such as a hygrometer which driven or rotary member performs a rotary oscillating or swinging movement. It will be apparent that by this or a similar direct coupling of the ball guiding tube 16a the recording device of the invention can be combined wtih different measuring instruments.

What I claim is:

1. A device for indicating measuring values of individual articles, such as cigarettes, including a balance scale having a pivotally supported beam at one end of which an article receiving means is arranged, a downwardly extending tube serving as an indicator hand of said scale fixedly attached to said beam at the pivot thereof to oscillate with the beam of said scale, a ball containing magazine arranged above said beam and adapted to drop one ball at a time into the upper end of said tube, a fixedly mounted indicating plate provided with a plurality of parallel grooves arranged beneath the lower end of said tube which during a weighing operation moves with its lower end relatively to said plate and the grooves therein, means for arresting said tube in the position it comes to rest during a weighing operation, means at said magazine for causing the discharge of a ball therefrom and dropping it into the upper end of said tube, said released ball passing downwardly in said tube, and means at the lower end of said tube for preventing a discharge of the ball from said tube until said arresting means is released, whereupon said ball is discharged from said tube and drops into one of said grooves in said indicating plate.

2. A device according to claim 1, in which said tube arresting means comprises a stationary abutment member and a movable member engaging said tube and clamping it against said abutment member, the open lower end of said tube thereby being moved toward a stop surface on said indicating plate which prevents a discharge of a ball from said tube until said movable member permits said tube to move away from said abutment member.

3. A device according to claim 1, in which said tube consists of two parts arranged in vertical alinement and pivotally connected with each other.

4. A device according to claim 1, in which said tube arresting means comprises a stationary abutment member and a movable member engaging said tube and clamping it against said abutment member, the open lower end of said tube thereby being moved toward a stop surface which prevents a discharge of a ball from said tube until said movable member permits said tube to move away from said abutment member, said stop surface being arranged on a plate forming a cover for the grooved surface of said indicating plate.

References Cited in the file of this patent

UNITED STATES PATENTS

| | | |
|---|---|---|
| 530,338 | Grover | Dec. 4, 1894 |
| 1,889,114 | Smith et al. | Nov. 29, 1932 |
| 1,889,921 | Jakosky | Dec. 6, 1932 |
| 2,537,628 | Hanson et al. | Jan. 9, 1951 |
| 2,887,079 | Nicholson | Mar. 10, 1959 |